(12) United States Patent
Shimada et al.

(10) Patent No.: US 10,318,258 B2
(45) Date of Patent: Jun. 11, 2019

(54) REFERENCE INFORMATION OUTPUT METHOD AND REFERENCE INFORMATION OUTPUT DEVICE

(71) Applicant: FUJITSU LIMITED, Kawasaki-shi, Kanagawa (JP)

(72) Inventors: Sayaka Shimada, Sumida (JP); Daisuke Hiyama, Kashiwa (JP); Hideya Ikeda, Urayasu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/651,890

(22) Filed: Jul. 17, 2017

(65) Prior Publication Data
US 2018/0074801 A1  Mar. 15, 2018

(30) Foreign Application Priority Data
Sep. 15, 2016 (JP) ................. 2016-180869

(51) Int. Cl.
*G06F 9/44* (2018.01)
*G06F 8/41* (2018.01)
*G06F 11/36* (2006.01)
*G06F 8/75* (2018.01)

(52) U.S. Cl.
CPC ............ *G06F 8/43* (2013.01); *G06F 8/75* (2013.01); *G06F 11/36* (2013.01)

(58) Field of Classification Search
CPC ........................................... G06F 8/43
USPC .......................................... 717/144
See application file for complete search history.

(56) References Cited

U.S. PATENT DOCUMENTS

| | | | | |
|---|---|---|---|---|
| 7,430,670 | B1* | 9/2008 | Horning | G06F 21/14 713/190 |
| 7,478,385 | B2* | 1/2009 | Sierer | G06F 8/61 717/168 |
| 7,555,551 | B1* | 6/2009 | McCorkendale | G06F 8/65 709/225 |
| 7,574,706 | B2* | 8/2009 | Meulemans | G06F 8/65 717/174 |
| 2004/0181790 | A1* | 9/2004 | Herrick | G06F 8/60 717/168 |
| 2006/0075001 | A1* | 4/2006 | Canning | G06F 8/65 |

(Continued)

FOREIGN PATENT DOCUMENTS

| | | |
|---|---|---|
| JP | 2013-134521 | 7/2013 |
| JP | 2014-170530 | 9/2014 |

*Primary Examiner* — Evral E Bodden
(74) *Attorney, Agent, or Firm* — Fujitsu Patent Center

(57) ABSTRACT

Provided is a non-transitory computer readable storage medium storing a program causing a computer to execute a process, the process including: obtaining an analysis result of a program hierarchically structured by a plurality of hierarchies; identifying an exclusion request of a check content of a same kind as a specific check content by referring to a storage unit storing information about a past exclusion request of a check content when the specific check content in the analysis result is displayed in association with a part corresponding to the specific check content of the program; outputting reference information for an exclusion request of the specific check content based on a request result of the exclusion request of the check content of the same kind, and a difference between positions in the plurality of hierarchies of the specific check content and the check content of the same kind in the program.

15 Claims, 21 Drawing Sheets

(56) References Cited

U.S. PATENT DOCUMENTS

| | | | |
|---|---|---|---|
| 2007/0234305 A1* | 10/2007 | Mishra | G06F 8/43 717/128 |
| 2010/0023926 A1* | 1/2010 | Sugawara | G06F 8/458 717/120 |
| 2014/0244645 A1 | 8/2014 | Muske et al. | |

* cited by examiner

FIG. 5

| EXECUTION TIME | PROJECT NAME | SOURCE PATH | PACKAGE | CLASS |
|---|---|---|---|---|
| 2016/6/1 11:00 | A1Project | D:¥AAA¥BBB¥... | com.fujitsu... | Aclass |
| 2016/6/2 12:00 | Bproject | D:¥AAA¥BBB¥... | com.fujitsu... | Bclass |
| 2016/6/3 11:30 | A2Project | D:¥AAA¥BBB¥... | com.fujitsu... | Aclass |
| 2016/6/4 15:00 | Cproject | D:¥AAA¥BBB¥... | com.fujitsu... | Cclass |

| METHOD | LINE | TOOL NAME | RULE ID | MESSAGE | CASE NAME | STATUS |
|---|---|---|---|---|---|---|
| - | 0 | CG | 111111 | PLEASE ~. | A COMPANY | EXCLUSION RECOMMENDATION |
| copy | 100 | FB | NM | PLEASE ~. | B COMPANY | CORRECTION RECOMMENDATION |
| copy | 100 | CS | ~Check | PLEASE ~. | A COMPANY | EXCLUSION RECOMMENDATION |
| copy | 100 | PMD | ~Check | PLEASE ~. | C COMPANY | - |

| REQUEST DATE | PROJECT NAME | RE-QUESTER | TEAM | PACKAGE | CLASS | METHOD | TOOL NAME |
|---|---|---|---|---|---|---|---|
| 2016/6/2 12:00 | A1Project | TANAKA | FUNCTION 1 | com.fujitsu | *Service | * | CS |
| 2016/6/3 12:00 | Bproject | SUZUKI | FUNCTION 1 | com.fujitsu | * | Init | CG |
| 2016/6/4 12:00 | A2Project | SATOH | FUNCTION 2 | com.fujitsu | Init* | * | CG |
| 2016/6/5 12:00 | Cproject | YAMADA | FUNCTION 1 | com.fujitsu | * | * | FB |

| RULE ID | REASON | CASE NAME | STATUS | COMMENT | RE-SPONDER | RESPONSE DATE |
|---|---|---|---|---|---|---|
| *Check | BECAUSE ~. | A COMPANY | PROVISIONALLY REGISTERED | – | FUJITSU | 6/3 |
| 111111 | BECAUSE ~. | B COMPANY | ACCEPTED | ACCEPTED BECAUSE ~. | FUJITSU | 6/4 |
| 122222 | BECAUSE ~. | A COMPANY | ACCEPTED | ACCEPTED BECAUSE ~. | FUJITSU | 6/5 |
| BC_ | BECAUSE ~. | C COMPANY | REJECTED | REJECTED BECAUSE ~. | FUJITSU | 6/6 |

T2

FIG. 14A
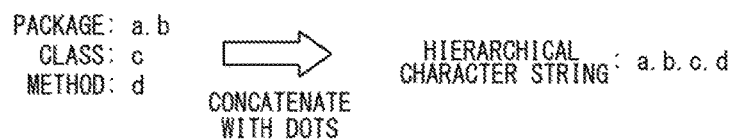
FIG. 14B
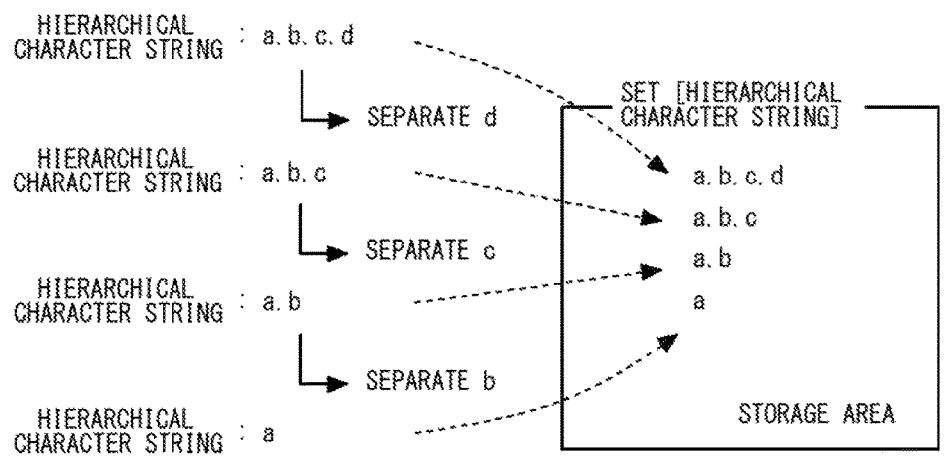
FIG. 14C
| NUMBER OF CASES COUNT TABLE | | |
|---|---|---|
| HIERARCHICAL CHARACTER STRING | NUMBER OF ACCEPTANCES OF REQUEST FOR EXCLUSION | NUMBER OF REJECTIONS OF REQUEST FOR EXCLUSION |
| a | 0 | 0 |
| a.b | 10 | 2 |
| a.b.c | 0 | 10 |
| a.b.c.d | 1 | 1 |

FIG. 17

EXCLUSION REQUEST SCREEN

| TOOL NAME | CodeG | Bx1 |
| RULE ID | A10000 | Bx1 |
| PACKAGE | com.fujitsu. | Bx1 |
| CLASS | Sample | Bx1 |
| METHOD | methodA | Bx1 |
| MESSAGE | WILL YOU ~~. | Bx1 |
| REASON | BECAUSE ~~~~. | Bx2 |
| ※MUST BE FILLED IN | | |
| TEAM NAME | A TEAM | Bx1 |

NAME  TARO FUJITSU — Bx1

A SIMILAR SUGGESTION WAS REJECTED IN THE PAST.
ARE YOU SURE TO MAKE A REQUEST?

[REQUEST] Bt1    [CANCEL] Bt2

EXCLUSION REQUEST LIST SCREEN

PROVISIONALLY-REGISTERED REQUEST LIST

| PROJECT NAME | TEAM NAME | REQUEST DATE | REQUESTER | TOOL NAME | RULE ID | |
|---|---|---|---|---|---|---|
| Aproject | A TEAM | 6/23 | TARO FUJITSU | CG | A10000 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |
| Aproject | A TEAM | 6/23 | TARO FUJITSU | CG | A11111 | SELECT |

FIG. 21

EXCLUSION REQUEST CHECK SCREEN

| REQUEST DATE | 2016/6/23 12:00 | RE-QUESTER | TARO FUJITSU | TEAM NAME | A TEAM |
|---|---|---|---|---|---|

| TOOL NAME | CodeG | | RULE ID | A10000 |
|---|---|---|---|---|

| PROJECT NAME | Aproject |
|---|---|
| PACKAGE | com.fujitsu. |
| CLASS | Sample |
| METHOD | methodA |
| LINE | 100 |
| MESSAGE | WILL YOU ~~ ? |
| REASON FOR REQUEST | BECAUSE ~~ |

⎱ 41

HISTORY OF SIMILAR REQUESTS FOR EXCLUSION IN THE PAST

| CASE | STATUS | PACKAGE | CLASS | METHOD | LINE | MESSAGE | REASON | COMMENT | RESPONDER |
|---|---|---|---|---|---|---|---|---|---|
| A COMPANY | ACCEPTED | | | | | | | | |
| B COMPANY | ACCEPTED | | | | | | | | |
| C COMPANY | REJECTED | | | | | | | | |

⎱ 42

● APPROVE    ○ REJECT — Bt4

COMMENT [                              ] — Bx3

[REGISTER]   [CANCEL]
   Bt5         Bt6

Bt4

REFERENCE INFORMATION OUTPUT METHOD AND REFERENCE INFORMATION OUTPUT DEVICE

CROSS-REFERENCE TO RELATED APPLICATION

This application is based upon and claims the benefit of priority of the prior Japanese Patent Application No. 2016-180869 filed on Sep. 15, 2016, the entire contents of which are incorporated herein by reference.

FIELD

A certain aspect of the embodiments is related to a non-transitory computer-readable storage medium, a reference information output method, and a reference information output device.

BACKGROUND

There has been known static analysis for source code as disclosed in, for example, Japanese Patent Application Publication No. 2013-134521. The static analysis finds various problems with quality, such as bugs and violations of coding rules in the source code.

SUMMARY

According to a first aspect of the embodiments, there is provided a non-transitory computer readable storage medium storing a program causing a computer to execute a process, the process including: obtaining an analysis result of a program hierarchically structured by a plurality of hierarchies; identifying a request for exclusion of a check content that is of a same kind as a specific check content included in the analysis result by referring to a storage unit storing information about a past request for exclusion of a check content when the specific check content is displayed in association with a part, which corresponds to the specific check content, of the program; and outputting reference information related to a request for exclusion of the specific check content depending on a request result of the request for exclusion of the check content that is of the same kind and a difference between a position in the plurality of hierarchies of the specific check content in the program and a position in the plurality of hierarchies of the check content that is of the same kind.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a check result table;

FIG. 6 illustrates an exclusion rule table;

FIG. 14A through FIG. 14C are diagrams for describing the history analysis process;

FIG. 17 illustrates an exclusion request screen;

FIG. 20 illustrates an exclusion request list screen; and

FIG. 21 illustrates an exclusion request check screen.

DESCRIPTION OF EMBODIMENTS

The above various problems are fed back to the developers of the source code as check results of the static analysis. The check results may contain useless suggestions as well as useful suggestions. Examples of the useless suggestions include a suggestion that is unimportant to developers and a suggestion indicating the code that does not need to be corrected for the convenience of the project.

Developers can make a request for exclusion to exclude the useless suggestion from next check results. However, since developers need to check the check results one by one to determine whether or not a request for exclusion is necessary, it takes a lot of time.

Hereinafter, a description will be given of an embodiment for carrying out the present case with reference to the accompanying drawings.

Figure 1:
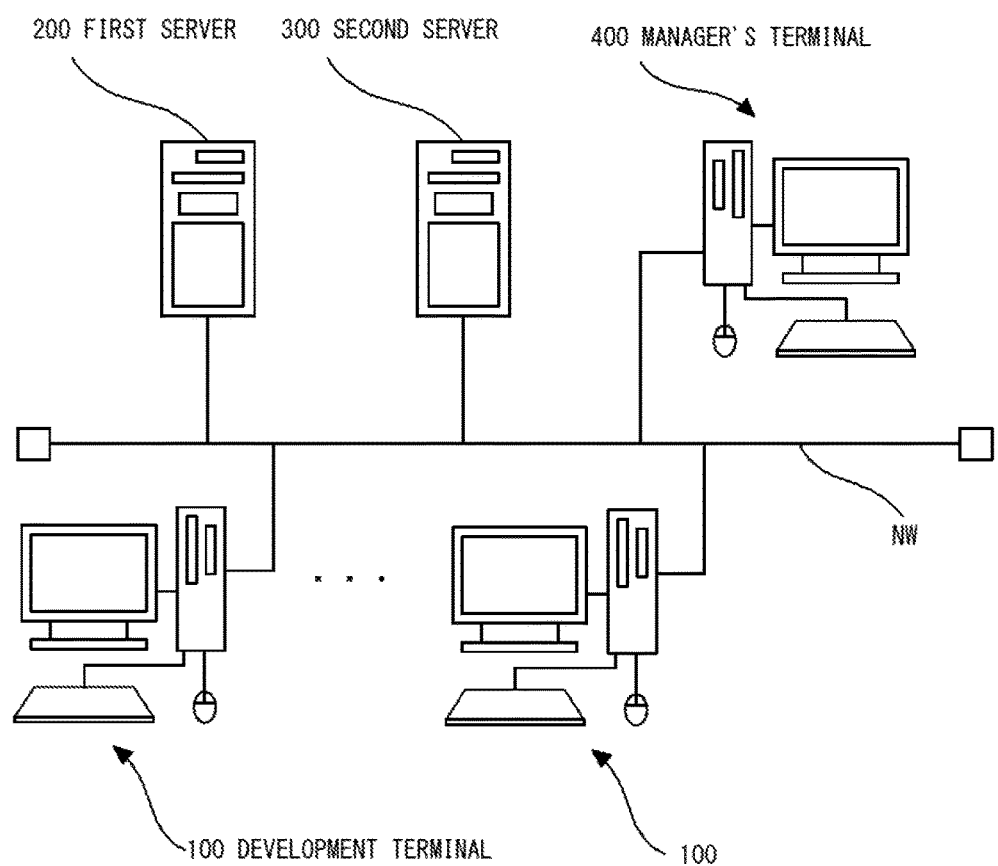
FIG. 1 is a diagram for describing an exemplary reference information output system.

FIG. 1 is a diagram for describing an exemplary reference information output system S. The reference information output system S is a computer system configured to output reference information helpful to make a request for exclusion. The reference information output system S includes a plurality of development terminals 100, a first server 200, a second server 300 as a reference information output device, and a manager's terminal 400. FIG. 1 illustrates Personal Computers (PCs) as examples of the development terminal 100 and the manager's terminal 400, but the development terminal 100 and the manager's terminal 400 may be smart devices such as tablet terminals. In addition, FIG. 1 illustrates a plurality of development terminals 100, but the number of the development terminals 100 may be one. Furthermore, one or some of the plurality of development terminals 100 may be located in a building (for example, a building in a remote location) different from a building in which the rest is located.

The development terminals 100, the first server 200, the second server 300, and the manager's terminal 400 are interconnected through a communication network NW. Examples of the communication network NW include, but are not limited to, a wired network such as the Internet or a Local Area Network (LAN). A part of the communication network NW may use a wireless network using radio waves.

The development terminal 100 is used by a developer who creates a source code. When the developer finishes creating or correcting a source code, the development terminal 100 transmits the source code to the first server 200 according to the instruction from the developer. The first server 200 performs static analysis for the source code. More particularly, when the development terminal 100 transmits a source code, the first server 200 receives the source code and stores the received source code. After receiving the source code, the first server 200 periodically or irregularly performs static analysis for the source code by using various static analysis functions implemented in the first server 200, and uploads an electronic file containing analysis results to the second server 300 as check results.

The second server 300 stores the check results uploaded from the first server 200. Additionally, the second server 300 outputs to the development terminal 100 reference information helpful to make a request for exclusion. More particularly, when the development terminal 100 requests the provision of the check contents (more specifically, suggestion messages) of the check results, the second server 300 identifies the reference information by using the check results and the responses to the requests for exclusion of check results that were made in the past, and outputs the check content in combination with the identified reference information to the development terminal 100. The developer checks the check content and the reference information output to the development terminal 100, and then determines whether to request the exclusion of the check content to a manager. The reference information includes an exclusion request recommendation and a correction recommendation. The exclusion request recommendation is information that recommends making a request for exclusion of a specific check result. The correction recommendation is information that recommends correcting the part corresponding to the specific check result of the source code without making a request for exclusion.

Thus, when the exclusion request recommendation is output to the development terminal 100, the developer determines that a request for exclusion is likely to be approved if the developer submits the request for exclusion to the manager because the specific check result is a useless suggestion, making a request for exclusion. In contrast, when the correction recommendation is output to the development terminal 100, the developer determines that a request for exclusion is likely to be rejected even if the developer submits the request for exclusion to the manager because the specific check result is a useful suggestion, correcting the corresponding part without making a request for exclusion. Accordingly, the quality of the source code is improved early in development.

When a request for exclusion is submitted at the development terminal 100, the development terminal 100 transmits the contents of the request for exclusion to the second server 300. When receiving the contents of the request for exclusion, the second server 300 stores the received contents of the request for exclusion in the form of a provisional registration that is one of the forms of registration. The manager who manages the quality of source codes operates the manager's terminal 400 to display the contents of the request that have been provisionally registered on the manager's terminal 400, and determines whether to approve and accept the contents of the request or disapprove and reject the contents of the request.

When the manager approves the contents of the request at the manager's terminal 400, the manager's terminal 400 transmits information indicating the approval to the second server 300. Then, when receiving the information indicating the approval, the second server 300 definitively registers the provisionally registered contents of the request. More specifically, the second server 300 changes the state of the registered contents from "provisionally-registered" to "accepted". In contrast, when the manager rejects the contents of the request at the manager's terminal 400, the manager's terminal 400 transmits information indicating the rejection to the second server 300. When receiving the information indicating the rejection, the second server 300 definitively registers the provisionally registered contents of the request. More specifically, the second server 300 changes the state of the registered contents from "provisionally-registered" to "rejected". This process stores the check results including acceptance or rejection as a response to a request for exclusion in the second server 300 as a history. This history is used as the past check results when a next request for exclusion is made. Thus, as the number of use increases, the more accurate reference information is output.

Hereinafter, the details of the above-described development terminal 100, the first server 200, the second server 300, and the manager's terminal 400 will be described with reference to the accompanying drawings.

Figure 2:
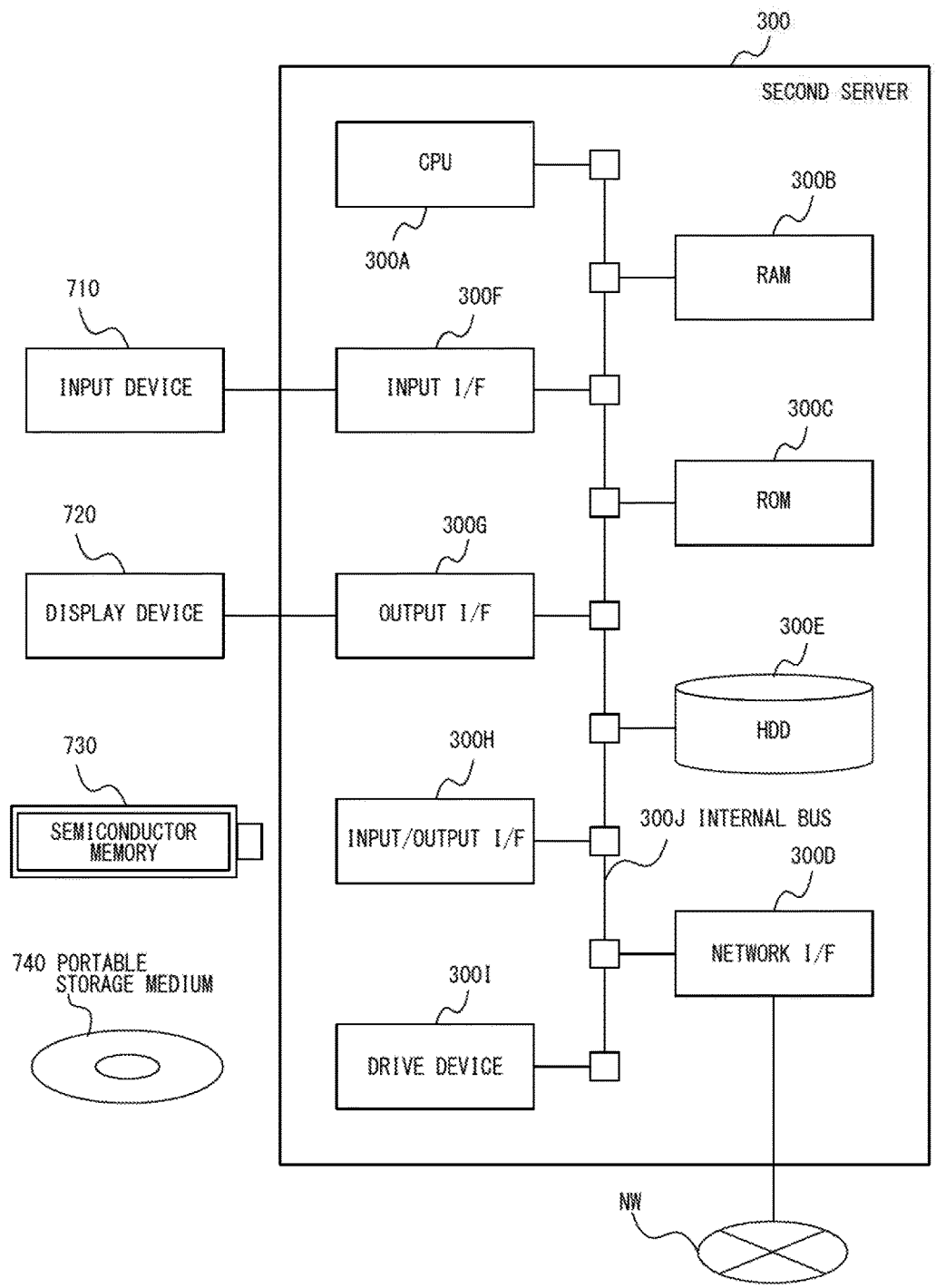
FIG. 2 illustrates a hardware configuration of a second server.

FIG. 2 illustrates a hardware configuration of the second server 300. Since the development terminal 100, the first server 200, and the manager's terminal 400 basically have the same structure as the second server 300, the description thereof is omitted.

The second server 300 includes at least a central processing unit (CPU) 300A, a random access memory (RAM) 300B, a read only memory (ROM) 300C, and a network I/F (interface) 300D. The second server 300 may include at least one of a hard disk drive (HDD) 300E, an input I/F 300F, an output I/F 300G an input/output I/F 300H, or a drive device 300I as necessary. The CPU 300A through the drive device 300I are interconnected through an internal bus 300J. A computer is implemented by the cooperation of at least the CPU 300A and the RAM 300B.

An input device 710 is coupled to the input I/F 300F. Examples of the input device 710 include, but are not limited to, a keyboard and a mouse. A display device 720 is coupled to the output I/F 300G. Examples of the display device 720 include, but are not limited to, a liquid crystal display. A semiconductor memory 730 is coupled to the input/output I/F 300H. Examples of the semiconductor memory 730 include, but are not limited to, a universal serial bus (USB) memory and a flash memory. The input/output I/F 300H reads programs and data stored in the semiconductor memory 730. The input I/F 300F and the input/output I/F 300H include, for example USB ports. The output I/F 300G includes, for example a display port.

A portable storage medium 740 is inserted into the drive device 300I. Examples of the portable storage medium 740 include, but are not limited to, removable discs such as a compact disc (CD)-ROM and a digital versatile disc (DVD). The drive device 300I reads programs and data stored in the portable storage medium 740. The network I/F 300D includes, for example, a port and a physical layer chip (PHY chip). The second server 300 is coupled to the communication network NW via the network I/F 300D.

Programs stored in the ROM 300C or the HDD 300E are stored in the above-described RAM 300B by the CPU 300A. Programs stored in the portable storage medium 740 is stored in the RAM 300B by the CPU 300A. The execution of the stored programs by the CPU 300A implements various functions described later in the second server 300, and allows the second server 300 to execute various processes described later. It is sufficient if the programs are according to flowcharts described later.

The functions of the first server 200 will be described with reference to FIG. 3.

Figure 3:
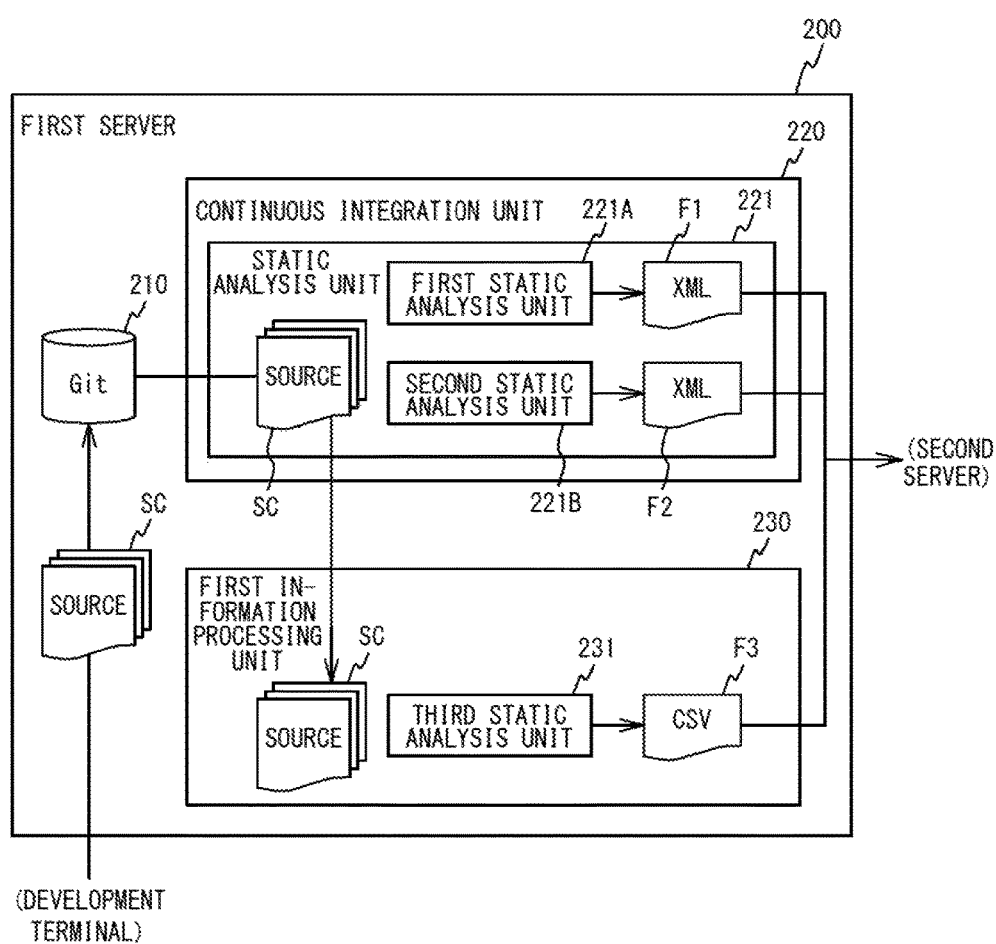
FIG. 3 is an exemplary functional block diagram of a first server.

FIG. 3 is an exemplary functional block diagram of the first server 200. The first server 200 includes a Git 210, a continuous integration unit 220, and a first information processing unit 230 as illustrated in FIG. 3. The continuous integration unit 220 includes a static analysis unit 221. The static analysis unit 221 includes a first static analysis unit 221A and a second static analysis unit 221B. On the other hand, the first information processing unit 230 includes a third static analysis unit 231.

The Git 210 is a version control system or a kind of repository. Thus, when the development terminal 100 transmits a source code SC, the Git 210 stores the source code SC. The continuous integration unit 220 provides functions for improving the quality at the time of creating a source code such as a source code inspection and for shortening delivery time of the source code. Examples of the continuous integration unit 220 include Jenkins and Hudson (registered trademark). The continuous integration unit 220 obtains the source code SC from the Git 210 periodically or irregularly, and stores the obtained source code SC in the static analysis unit 221. For example, the continuous integration unit 220 obtains the source code SC when the source code SC is stored in the Git 210, or obtains the source code SC at a specific set time.

The first static analysis unit 221A and the second static analysis unit 221B execute different static analyses on the source code SC. For example, the first static analysis unit 221A executes a static analysis to find a violation of a coding standard, while the second static analysis unit 221B executes a static analysis to find a defect such as a bug. Examples of the first static analysis unit 221A include CheckStyle (registered trademark). Examples of the second static analysis unit 221B include FindBugs (registered trademark). The first static analysis unit 221A and the second static analysis unit 221B output electronic files F1 and F2 containing the analysis results of the static analyses in Extensible Markup Language (XML) format as check results to the second server 300.

On the other hand, the first information processing unit 230 duplicates the source code SC stored in the static analysis unit 221 to obtain the source code SC. The third static analysis unit 231 executes a static analysis different from the static analyses executed by the first static analysis unit 221A and the second static analysis unit 221B on the source code SC. The third static analysis unit 231 outputs an electronic file F3 containing the analysis results of the static analysis in Comma-Separated Values (CSV) format as check results to the second server 300.

Next, the functions of the development terminal 100 and the second server 300 will be described with reference to FIG. 4 through FIG. 7.

Figure 4:
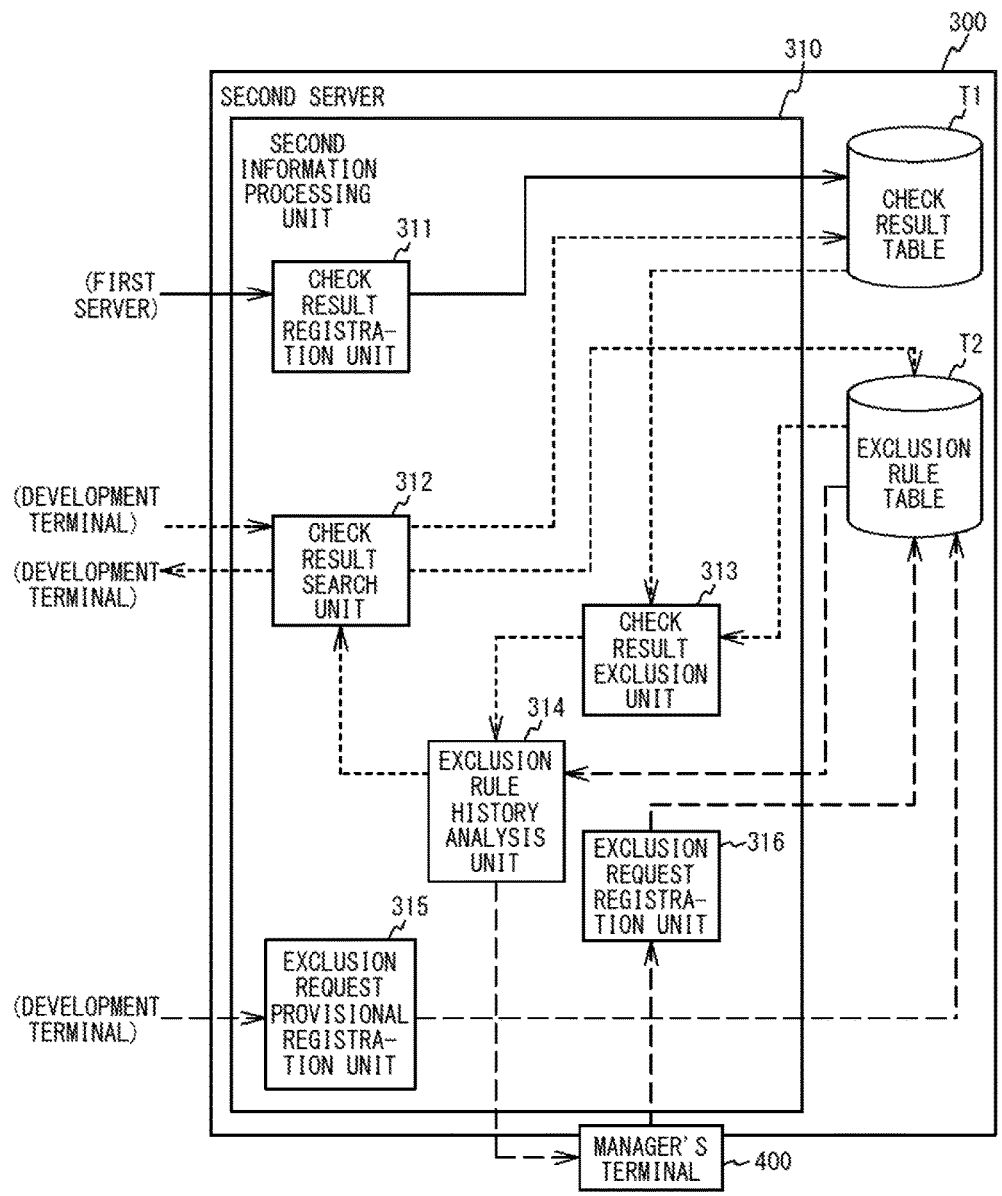
FIG. 4 is an exemplary functional block diagram of the second server.
Figure 7:
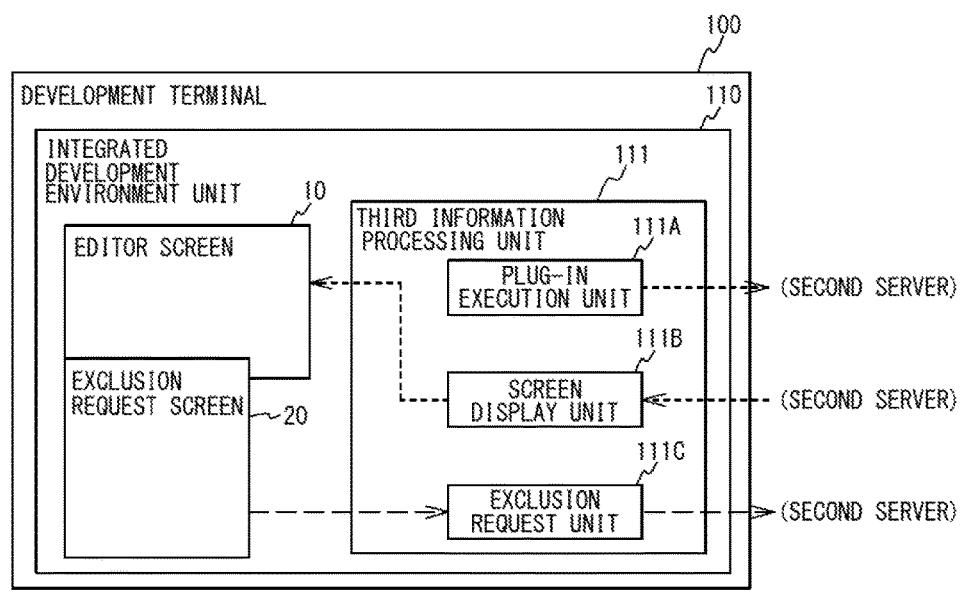
FIG. 7 is an exemplary functional block diagram of a development terminal.

FIG. 4 is an exemplary functional block diagram of the second server 300. FIG. 5 illustrates a check result table T1. FIG. 6 illustrates an exclusion rule table T2. FIG. 7 is an exemplary functional block diagram of the development terminal 100.

As illustrated in FIG. 4, the second server 300 includes a second information processing unit 310, a check result table T1, and an exclusion rule table T2. The second information processing unit 310 includes a check result registration unit 311, a check result search unit 312, a check result exclusion unit 313, an exclusion rule history analysis unit 314, an exclusion request provisional registration unit 315, and an exclusion request registration unit 316.

The check result registration unit 311 stores the check results transmitted from the first server 200 in the check result table T1. As described above, the check results are provided by the electronic files F1, F2 and F3 of different formats. Thus, the check result registration unit 311 initially compiles the electronic files F1, F2, and F3, and then converts the formats of the electronic file F1, F2, and F3 to store them in the check result table T1. This process allows the check result table T1 to store the check results of the static analyses executed on the source code SC.

More specifically, referring to FIG. 5, the check result table T1 includes various items related to the check result as constituent elements. Each item will be described. "EXECUSION TIME" represents the time when the static analysis was executed. "PROJECT NAME" represents the name of the project for which the source code SC is used. The project name is obtained from information displayed on or inside a screen by using Application Programming Interface (API). "SOURCE PATH" represents the path of the source code SC. "PACKAGE", "CLASS", and "METHOD" represent the structures of Java (registered trademark). In addition to these structures, an interface and a member may be added. "LINE" represents the line number of the source code SC. "TOOL NAME" represents the abbreviation of a static analysis tool. For example, the tool name "FB" represents FindBugs (registered trademark) described above. "RULE ID" represents identification information uniquely indicating a check item of the static analysis tool. "MESSAGE" represents a suggestion by the static analysis. For example, when a glitch or defect of the source code SC is found by the static analysis, a message such as "Please correct." is stored. "CASE NAME" represents the name of the company that is the target of the project, for example. "STATUS" represents a recommendation status, and stores one of an exclusion request recommendation (described as "EXCLUSION RECOMMENDATION" in FIG. 5) or a correction recommendation as the recommendation status through the process for updating the recommendation status described later. Thus, before the process for updating the recommendation status is executed, none of the exclusion recommendation and the correction recommendation is stored in the status, and null is stored in the status instead. In other words, the check result table T1 immediately after storing the check results includes the constituent elements other than the recommendation status.

Referring back to FIG. 4, the exclusion rule table T2 stores exclusion rules each indicating the relation between the contents of a past request for exclusion and the response to the contents of the past request. More specifically, as illustrated in FIG. 6, the exclusion rule table T2 includes various items related to the exclusion rule as constituent elements. Hereinafter, the constituent elements of the exclusion rule will be described, but the description of the constituent elements that are the same as those of the check result described above will be omitted. "REQUEST DATE" represents the request date of a request for exclusion, "REQUESTER" represents the requester of the request for exclusion, "TEAM" represents the name of the team to which the requester belongs, and "REASON FOR REQUEST" represents the reason for making the request for exclusion. "STATUS" represents the status of the response to the request for exclusion. For example, when a requester makes a request for exclusion, the contents of the request are stored in the exclusion rule in the form of provisional registration. Then, when a manager approves the request for exclusion, the status in the exclusion rule is changed from "provisionally registered" to "accepted". In contrast, when the manager rejects the request for exclusion, the status in the exclusion rule is changed from "provisionally registered" to "rejected". "COMMENT" represents the reason why the manager approved or rejected the request. "RESPONDER" and "RESPONSE DATE" represent the responder who handled the request for exclusion and the response date, respectively. The exclusion rule table T2 may include an element for storing the line number of the source code SC. As described above, the exclusion rule table T2 manages the responses to the requests for exclusion as a history, and the tendencies of the past responses to the requests for exclusion with respect to the package, the class, the method, and the static analysis tool are stored in the exclusion rule table T2.

The development terminal 100 includes an integrated development environment unit 110 as illustrated in FIG. 7. The integrated development environment unit 110 is implemented by, for example, Eclipse (registered trademark), Visual Studio, or WideStudio. The integrated development environment unit 110 includes a third information processing unit 111. The third information processing unit 111 includes a plug-in execution unit 111A, a screen display unit 111B, and an exclusion request unit 111C.

The plug-in execution unit 111A executes a plug-in when detecting that a specific operation has been performed on a specific character string displayed on an editor screen 10. Although the details will be described later, when detecting a specific operation (e.g., a left click) specifying a character string representing a static analysis tool displayed on the editor screen 10, the plug-in execution unit 111A obtains the project name on the editor screen 10 or the project name included in the editor screen 10, and then transmits the obtained project name to the second server 300. The second server 300 executes various information processing described later by using the project name, and outputs the reference information such as the exclusion request recommendation or the correction recommendation in combination with the check content. The screen display unit 111B outputs the check content and the reference information output from the second server 300 on the editor screen 10. This process allows the check content and the reference information such as the exclusion request recommendation or the correction recommendation to be displayed near the corresponding part of the source code SC displayed on the editor screen 10, and allows a marker for starting and displaying an exclusion request screen 20 to be displayed.

Furthermore, when a specific operation (e.g., a right click) specifying the marker displayed on the editor screen 10 is made, the exclusion request screen 20 is displayed on the development terminal 100. Furthermore, when a reason for request is input on the exclusion request screen 20 and a specific operation to submit the request is made, the exclusion request unit 111C detects the specific operation, and transmits the contents of the request displayed on the exclusion request screen 20 to the second server 300.

Referring back to FIG. 4, when the project name is transmitted from the development terminal 100, the check result search unit 312 searches the check result table T1 based on the received project name. The check result exclusion unit 313 obtains the check results as results of the search by the check result search unit 312. In addition, the check result search unit 312 searches the exclusion rule table T2 based on the received project name. The check result exclusion unit 313 obtains the exclusion rules as results of the search by the check result search unit 312. The check result exclusion unit 313 excludes (filters) some of the check results by using the obtained exclusion rules, and outputs the remaining check results after the exclusion and the exclusion rules to the exclusion rule history analysis unit 314. That is, the check result exclusion unit 313 excludes the check results that meet the exclusion rules from the subjects for subsequent processes, and narrows down the check results to the check results that are to be used in the subsequent processes.

The exclusion rule history analysis unit 314 uses the remaining check results after the exclusion and the exclusion rules to update the recommendation statuses in the remaining check results after the exclusion. This process stores the reference information such as the exclusion request recommendation or the correction recommendation in the remaining check results after the exclusion. After updating, the exclusion rule history analysis unit 314 converts the remaining check results after the exclusion of which the recommendation statuses have been updated into plug-in format, and outputs the converted check results to the check result search unit 312. The exclusion rule history analysis unit 314 will be described in detail later. The check result search unit 312 converts the remaining check results after the exclusion in plug-in format into JSON format, and outputs the check contents and the reference information included in the remaining check results after the exclusion in JSON format to the development terminal 100. This process allows the above-described screen display unit 111B to output the check contents and the reference information on the editor screen 10.

The exclusion request provisional registration unit 315 registers the contents of a request and the like transmitted from the development terminal 100 in the exclusion rule table T2 and sets "provisionally registered" to the status thereof. On the other hand, the above-described exclusion rule history analysis unit 314 obtains all the exclusion rules from the exclusion rule table T2 based on the instruction from the manager's terminal 400. In addition, the exclusion rule history analysis unit 314 extracts the exclusion rules similar to the contents of the request and holds the extracted exclusion rules based on another instruction from the manager's terminal 400. The manager's terminal 400 obtains the exclusion rules held by the exclusion rule history analysis unit 314 together with the contents of the request. This process allows the manager's terminal 400 to display the contents of the request and the exclusion rules similar to the contents of the request. When detecting the instruction related to the response to the contents of the request, the exclusion request registration unit 316 updates the status of the exclusion rule to the status corresponding to the response. More specifically, when approving the contents of the request, the exclusion request registration unit 316 changes the status of the exclusion rule from "provisionally registered" to "accepted". In contrast, when rejecting the contents of the request, the exclusion request registration unit 316 changes the status of the exclusion from "provisionally registered" to "rejected".

With reference to FIG. 8 through FIG. 21, operations of the development terminal 100, the first server 200, the second server 300, and the manager's terminal 400 will be described.

Figure 8:
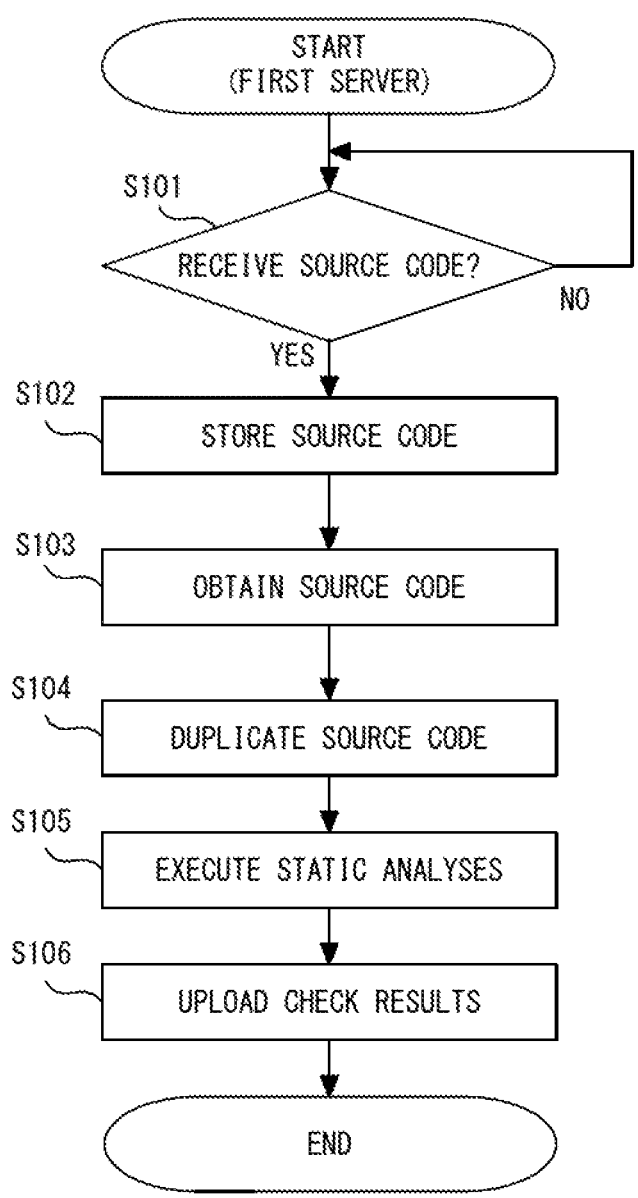
FIG. 8 is a flowchart of exemplary operations of the first server.
Figure 9:
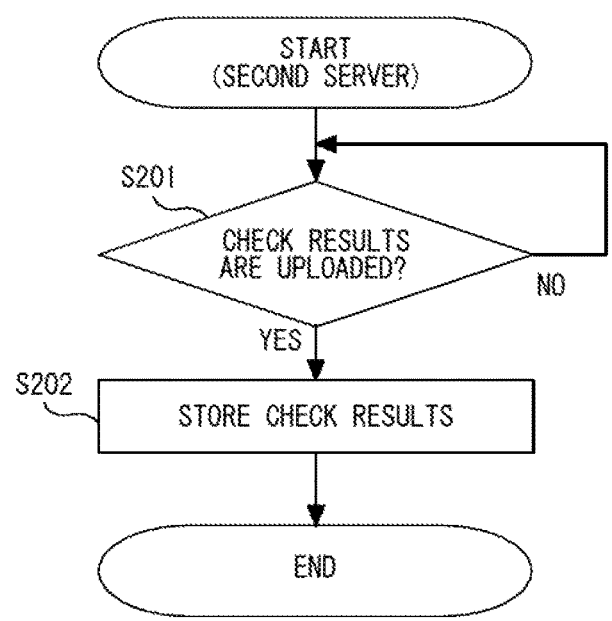
FIG. 9 is a flowchart of exemplary operations of the second server.

With reference to FIG. 8 and FIG. 9, a process of registering check results will be described. FIG. 8 is a flowchart of exemplary operations of the first server 200. FIG. 9 is a flowchart of exemplary operations of the second server 300. As illustrated in FIG. 8, the Git 210 of the first server 200 waits until the Git 210 receives the source code SC (step S101: NO). When the Git 210 receives the source code SC (step S101: YES), the Git 210 stores the source code SC (step S102). Upon completion of the processing of step S102, the continuous integration unit 220 obtains the source code SC stored in the Git 210 (step S103). Upon completion of the processing of step S103, the first information processing unit 230 duplicates the source code SC obtained by the continuous integration unit 220 (step S104).

Upon completion of the processing of step S104, the first static analysis unit 221A and the second static analysis unit 221B execute static analyses on the source code SC obtained by the continuous integration unit 220, and the third static analysis unit 231 executes a static analysis on the source code SC duplicated by the first information processing unit 230 (step S105). Upon completion of the processing of step S105, the first static analysis unit 221A, the second static analysis unit 221B, and the third static analysis unit 231 upload the analysis results of the static analyses as check results to the second server 300 (step S106), and ends the process.

On the other hand, as illustrated in FIG. 9, the check result registration unit 311 of the second server 300 waits until the check results are uploaded (step S201: NO). When the check results are uploaded (step S201: YES), the check result registration unit 311 stores the check results in the check result table T1 (step S202), and ends the process. Accordingly, the check result table T1 stores the check results of the static analyses for the source code SC.

Figure 10:
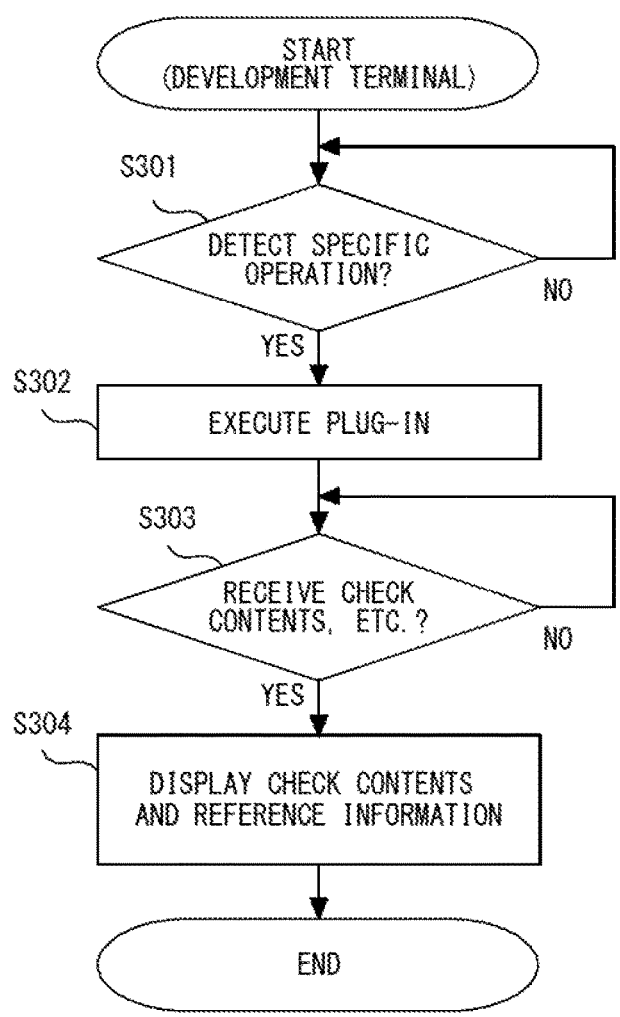
FIG. 10 is a flowchart of exemplary operations of the development terminal.
Figure 11:
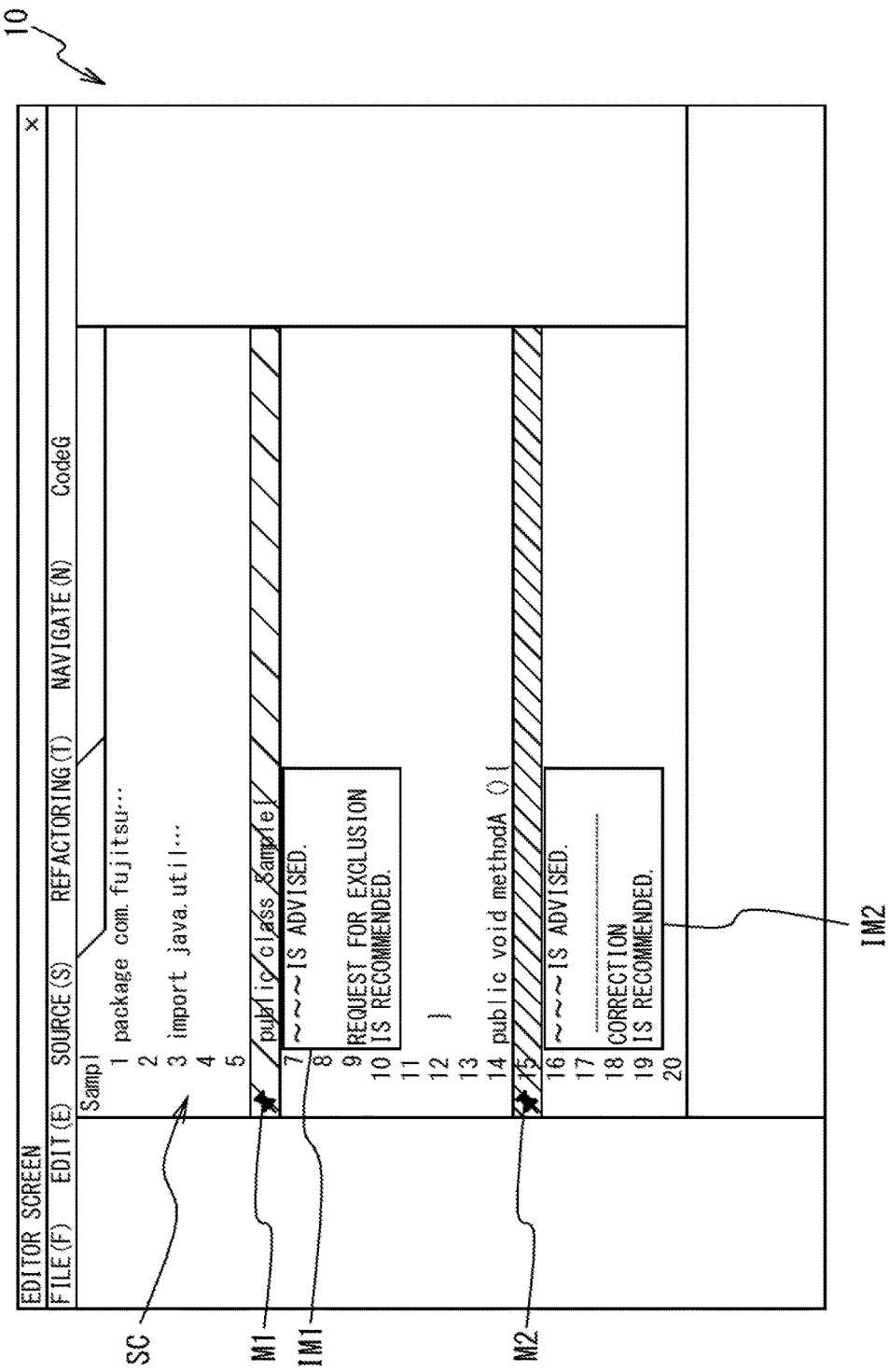
FIG. 11 illustrates an editor screen.
Figure 12:
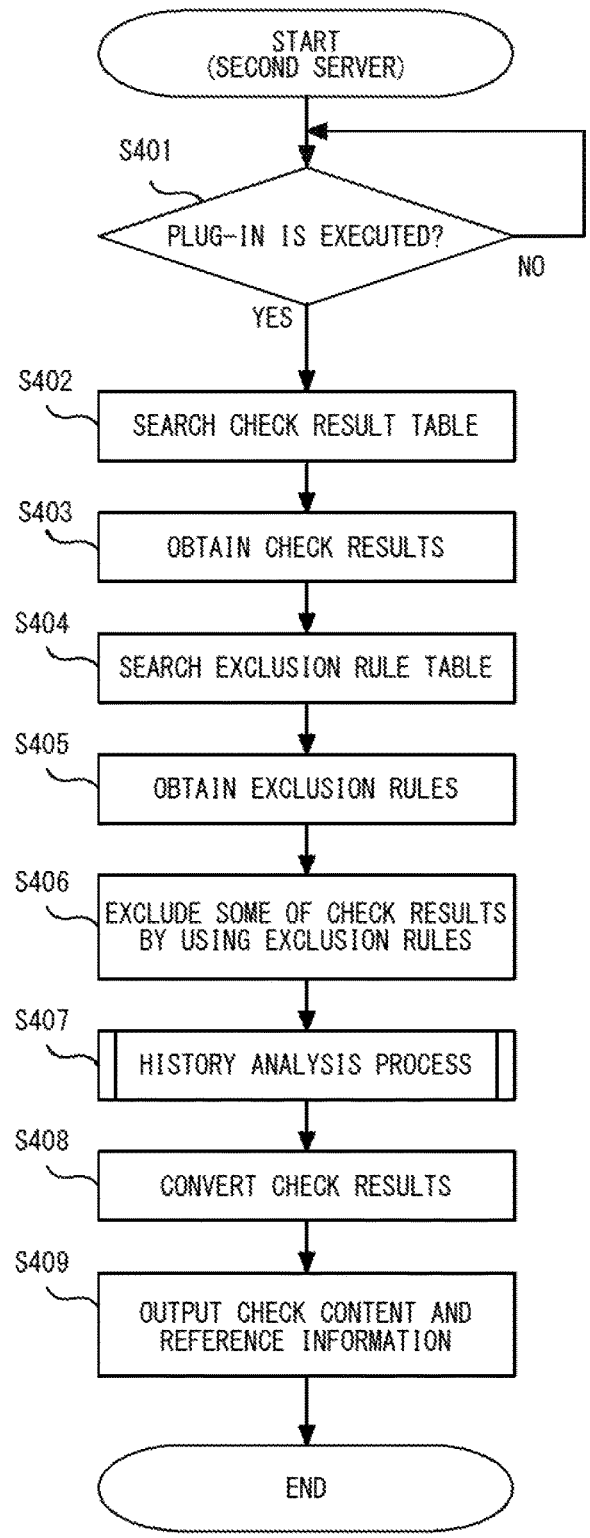
FIG. 12 is a flowchart of exemplary operations of the second server.

With reference to FIG. 10 through FIG. 12, processes to the displaying of the reference information on the editor screen 10 will be described.

FIG. 10 is a flowchart of exemplary operations of the development terminal 100. FIG. 11 illustrates the editor screen 10. FIG. 12 is a flowchart of exemplary operations of the second server 300.

As illustrated in FIG. 10, the plug-in execution unit 111A waits until the plug-in execution unit 111A detects a specific operation (step S301: NO). More specifically, as illustrated in FIG. 11, the plug-in execution unit 111A waits until a specific operation (e.g., a click) is performed on the specific character string (e.g., "CodeG") representing a static analysis tool displayed in the menu bar or the like of the editor screen 10. When detecting the specific operation (step S301: YES), the plug-in execution unit 111A executes a plug-in (step S302). More specifically, the plug-in execution unit 111A obtains the project name (not illustrated) included in the editor screen 10, and transmits the obtained project name to the second server 300. This process starts the output of the check contents and the reference information for the source code SC displayed on the editor screen 10. Upon completion of the processing of step S302, the screen display unit 111B waits until the screen display unit 111B receives the check contents and the like (more specifically, the check contents and the reference information) (step S303: NO).

On the other hand, as illustrated in FIG. 12, the check result search unit 312 of the second server 300 waits until the plug-in is executed (step S401: NO). More particularly, the check result search unit 312 waits until the project name is transmitted from the plug-in execution unit 111A. When determining that the plug-in is executed (step S401: YES), the check result search unit 312 searches the check result table (step S402). More particularly, the check result search unit 312 searches the check result table T1 based on the project name. Upon completion of the processing of step S402, the check result exclusion unit 313 obtains check results (step S403). More particularly, the check result exclusion unit 313 obtains the check results corresponding to the project name from the check result table.

Upon completion of the processing of step S403, the check result search unit 312 searches the exclusion rule table T2 (step S404). More particularly, the check result search unit 312 searches the exclusion rule table T2 based on the project name. Upon completion of the processing of step S404, the check result exclusion unit 313 obtains the exclusion rules (step S405). More particularly, the check result exclusion unit 313 obtains from the exclusion rule table T2 the exclusion rules corresponding to the project name.

Upon completion of the processing of step S405, the check result exclusion unit 313 excludes some of the check results by using the exclusion rules (step S406). For example, the constituent elements of the obtained check results are compared to the counterparts of the exclusion rules to narrow the check results down to the check results of which the constituent elements are identical to the counterparts of the exclusion rule. Examples of the constituent elements include the package, the class, and the method. That is, the check result exclusion unit 313 filters the check results to which the exclusion rules cannot be applied, and outputs the check results to which the exclusion rules cannot be applied as the remaining check results after the exclusion. Upon completion of the processing of step S406, the exclusion rule history analysis unit 314 executes a history analysis process (step S407). The history analysis process analyzes the history of past responses to the exclusion rules that are of the same kind as the remaining check results after the exclusion, and registers the reference information in the recommendation statuses of the remaining check results after the exclusion. The history analysis process will be described in detail later.

Upon completion of the processing of step S407, the exclusion rule history analysis unit 314 converts the check results (step S408). More particularly, the exclusion rule history analysis unit 314 converts the remaining check results after the exclusion into plug-in format, and the check result search unit 312 converts the remaining check results after the exclusion in plug-in format into JSON format. Upon completion of the processing of step S408, the check result search unit 312 outputs the check contents and the reference information (step S409). More particularly, the check result search unit 312 transmits the check contents and the reference information included in the remaining check results after the exclusion in JSON format to the development terminal 100.

Referring back to FIG. 10, when the second server 300 has transmitted the check contents and the reference information, the screen display unit 111B of the development terminal 100 receives the check contents and the reference information (step S303: YES), and displays the check contents and the reference information (step S304). More particularly, the screen display unit 111B displays a message as the check content in combination with the reference information in the corresponding part of the source code SC displayed on the editor screen 10, and displays a marker near the corresponding part. This process causes one image region IM1 to appear immediately under the sixth line of the source code SC as illustrated in FIG. 11, for example, the image region IM1 including a specific message "~~~ is advised." by the static analysis and a comment indicating that the message is a subject for the exclusion request recommendation. In addition, a marker M1 appears at the left side of the line number of the sixth line of the source code SC. In the same manner, one image region IM2 including a specific message "~~~ is advised." by the static analysis and a comment indicating that the message is a subject for the correction recommendation appears immediately under the fifteenth line of the source code SC, for example. In addition, a marker M2 appears at the left side of the line number of the fifteenth line of the source code SC.

As a result, the developer does not determine whether to make a request for exclusion only by the message by the static analysis, and determines whether to make a request for exclusion by taking into account the reference information (more specifically, the exclusion request recommendation or the correction recommendation) output together with the message. For example, when the exclusion request recommendation is output, the developer determines that the message to the line is a useless suggestion and a request for exclusion is likely to be approved when the developer makes the request for exclusion. Thus, the developer is motivated to make a request for exclusion. In contrast, when the correction recommendation is output, the developer determines that the message is a useful suggestion and a request for exclusion is likely to be rejected when the developer makes the request for exclusion. Thus, the developer is motivated to correct the source code SC.

Thus, the developer do not need to check messages of the check results one by one to determine the necessity of a request for exclusion. Therefore, the time and effort of making a request for exclusion is saved. Especially, if an enormous amount of check results are fed back at the end of the development near the delivery date, developers may lose their motivation for development. The present embodiment feeds back the check results divided into useful suggestions and useless suggestions at the early stage of development. Thus, the developer can efficiently correct the source code SC, and therefore reduce the quality degradation of the source code SC.

The above-described history analysis process will be described in further details with reference to FIG. 13 through FIG. 15B.

Figure 13:
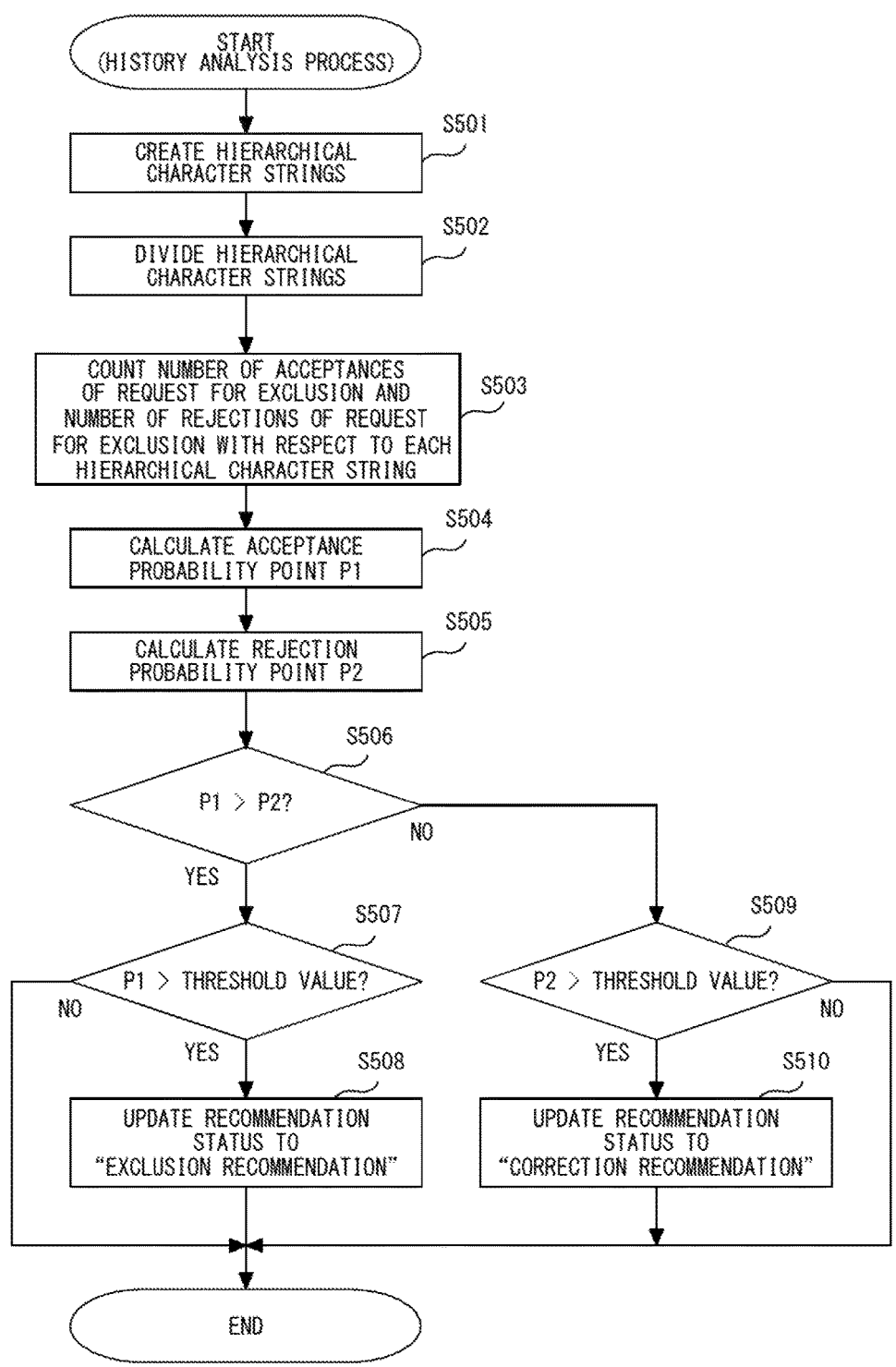
FIG. 13 is a flowchart of a history analysis process.
Figure 15A:
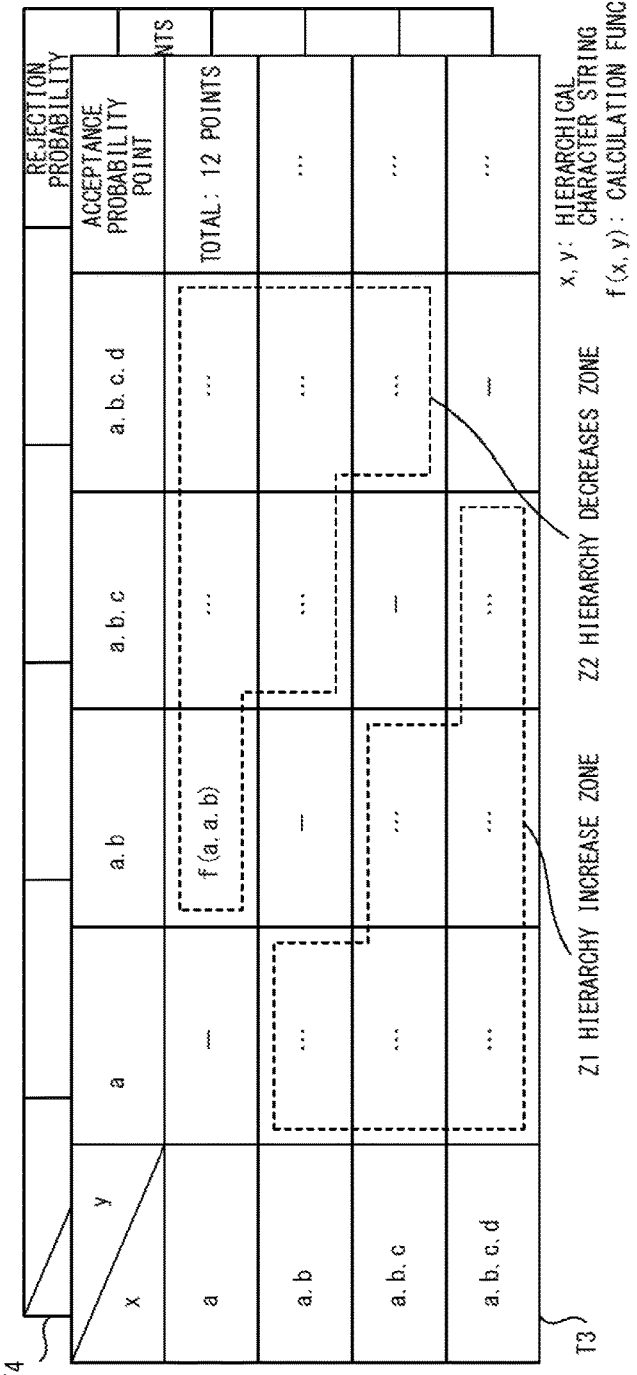
FIG. 15A and FIG. 15B are other diagrams for describing the history analysis process.
Figure 15B:
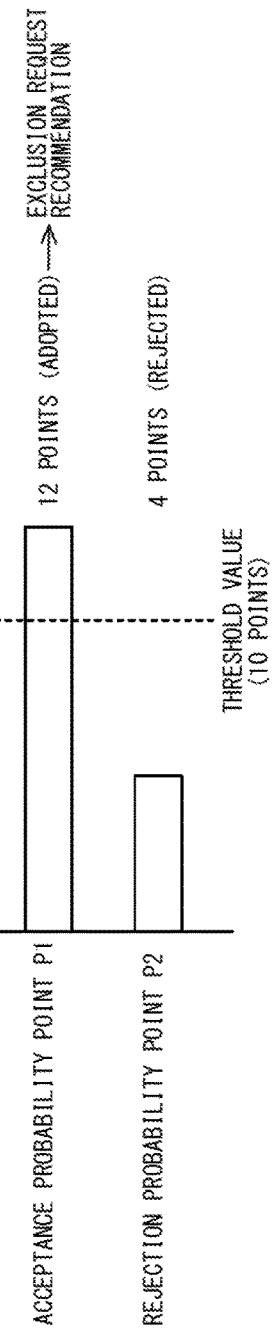

FIG. 13 is a flowchart of the history analysis process. FIG. 14A through FIG. 14C are diagrams for describing the history analysis process. FIG. 15A and FIG. 15B are other diagrams for describing the history analysis process. Upon completion of the processing of step S406 described with reference to FIG. 12, the exclusion rule history analysis unit 314 creates a hierarchical character string for the check result and a hierarchical character string for the exclusion rule (step S501) as illustrated in FIG. 13. For example, as illustrated in FIG. 14A, the exclusion rule history analysis unit 314 concatenates a character string "a.b" representing a package (e.g., "com.fujitsu"), a character string "c" representing a class (e.g., "Bclass"), and a character string "d" representing a method (e.g., "copy") to create the dot-delimited hierarchical character string "a.b.c.d". When only a package is used, the process of step S501 is skipped.

Upon completion of the processing of step S501, as illustrated in FIG. 13, the exclusion rule history analysis unit 314 divides the hierarchical character string of the check result and the hierarchical character string of the exclusion rule (step S502). For example, as illustrated in FIG. 14B, the hierarchical character string is divided by a dot every time when a dot appears in the order from the lowest hierarchy to the uppermost hierarchy, and stored in a storage area such as a main memory.

Upon completion of the processing of step S502, the exclusion rule history analysis unit 314 counts the number of acceptances of the request for exclusion and the number of rejections of the request for exclusion in the exclusion rules with respect to each hierarchical character string (step S503). More particularly, the exclusion rule history analysis unit 314 extracts one exclusion rule of which the rule ID is identical to the rule ID of the first check result. Then, the exclusion rule history analysis unit 314 extracts next one exclusion rule when "provisionally registered" is stored in the status of the extracted exclusion rule. On the other hand, when "accepted" is stored in the status, the exclusion rule history analysis unit 314 increments the number of acceptances of the request for exclusion, while the exclusion rule history analysis unit 314 increments the number of rejections of the request for exclusion when "rejected" is stored. Then, next one exclusion rule is extracted. The exclusion rule history analysis unit 314 executes the same processing on all the exclusion rules of which the rule IDs are identical to the first check result of the remaining check results after the exclusion. Furthermore, upon completion of the processing on the first check result of the remaining check results after the exclusion, the exclusion rule history analysis unit 314 executes the same processing on the second and subsequent check results. Through this process, the number of acceptances of the request for exclusion and the number of rejections of the request for exclusion are counted with respect to each hierarchical character string of the exclusion table as illustrated in FIG. 14C.

Upon completion of the processing of step S503, the exclusion rule history analysis unit 314 calculates an acceptance probability point P1 (step S504), and calculates a rejection probability point P2 (step S505). More specifically, referring to FIG. 15A, the exclusion rule history analysis unit 314 creates a calculation table T3 for calculating the acceptance probability point P1 and a calculation table T4 for calculating the rejection probability point P2. The exclusion rule history analysis unit 314 then arranges the hierarchical character strings in the column direction as items x and arranges the hierarchical character strings in the row direction as items y in both the calculation tables T3 and T4. Then, the exclusion rule history analysis unit 314 calculates an acceptance probability basic point P1' and a rejection probability basic point P2' at all sections in which the hierarchical difference exists. Eventually, the exclusion rule history analysis unit 314 calculates the sum of the acceptance probability basic points P1' in the row direction as the acceptance probability point P1, and calculates the sum of the rejection probability basic points P2' in the row direction as the rejection probability point P2.

Here, the exclusion rule history analysis unit 314 calculates the acceptance probability basic point P1' and the rejection probability basic point P2' by using a predetermined calculation function f(x, y). The calculation function f(x, y) is expressed by the following equation.

Calculation function $f(x,y)$=(hierarchy increase coefficient^hierarchy increase number)×(hierarchy decrease coefficient^hierarchy decrease number)×(number of acceptances of $x$ or number of rejections of $x$)

The hierarchy increase coefficient and the hierarchy decrease coefficient represent the degree of relativity (for example, the distance) between hierarchies, and a larger value is set to the hierarchy decrease coefficient than to the hierarchy increase coefficient. For example, when 0.1 is set to the hierarchy increase coefficient, 0.5 is set to the hierarchy decrease coefficient. That is, as the hierarchical character string belongs to a higher hierarchy, the number of hierarchical character strings different from each other increases in the lower hierarchies than the hierarchical character string, and the degree of relativity thus becomes lower. In contrast, as the hierarchical character string belongs to a lower hierarchy, the number of hierarchical character strings different from each other decreases in the lower hierarchies than the hierarchical character string, and the degree of relativity thus becomes higher. Thus, the larger value is set to the hierarchy decrease coefficient than to the hierarchy increase coefficient.

In addition, the hierarchy increase number and the hierarchy decrease number represent the number of rear mismatch hierarchies between the hierarchical character strings. For example, the number of rear mismatch hierarchies between the hierarchical character string "a" expanded in the column direction and the hierarchical character string "a.b" expanded in the row direction is 1, and the hierarchy of the hierarchical character string "a.b" is lower than that of the hierarchical character string "a" because ".b" is concatenated to the hierarchical character string "a" in the lower hierarchy. For example, the number of rear mismatch hierarchies between the hierarchical character string "a.b.c.d" expanded in the column direction and the hierarchical character string "a" expanded in the row direction is 3, and the hierarchy of the hierarchical character string "a" is higher than that of the hierarchical character string "a.b.c.d" because nothing is concatenated to the hierarchical character string "a" in the lower hierarchy. Therefore, as illustrated in FIG. 15A, the calculation tables T3 and T4 are separated into a hierarchy increase zone Z1 and a hierarchy decrease zone Z2. The number of acceptances of x or the number of rejections of x corresponds to the number of acceptances of the request for exclusion or the number of rejections of the request for exclusion calculated at step S503, respectively. Through the above processes, the exclusion rule history analysis unit 314 calculates the acceptance probability point P1 and the rejection probability point P2. The exclusion rule history analysis unit 314 may output the calculation tables T3 and T4 in which the item x and the item y are mapped, and may output the calculation tables T3 and T4 further including the calculated acceptance probability point P1 and the calculated rejection probability point P2.

Referring back to FIG. 13, upon completion of the processing of step S505, the exclusion rule history analysis unit 314 determines whether the acceptance probability point P1 is greater than the rejection probability point P2 (step S506). When determining that the acceptance probability point P1 is greater than the rejection probability point P2 (step S506: YES), the exclusion rule history analysis unit 314 determines whether the acceptance probability point P1 is greater than a threshold value (step S507). When determining that the acceptance probability point P1 is greater than the threshold value (step S507: YES), the exclusion rule history analysis unit 314 updates the recommendation status of the remaining check result after the exclusion to "exclusion recommendation" (step S508), and ends the process. On the other hand, when determining that the acceptance probability point P1 is not greater than the threshold value (step S507: NO), the exclusion rule history analysis unit 314 skips the process of step S508, and ends the process.

In contrast, when determining that the acceptance probability point P1 is equal to or less than the rejection probability point P2 (step S506: NO), the exclusion rule history analysis unit 314 determines whether the rejection probability point P2 is greater than a threshold value (step S509). When determining that the rejection probability point P2 is greater than the threshold value (step S509: YES), the exclusion rule history analysis unit 314 updates the recommendation status of the remaining check result after the exclusion to "correction recommendation" (step S510), and ends the process. On the other hand, when determining that the rejection probability point P2 is not greater than the threshold value (step S509: NO), the exclusion rule history analysis unit 314 skips the process of step S510 and ends the process.

That is, as illustrated in FIG. 15B, the magnitude relationship between the acceptance probability point P1 and the rejection probability point P2 is determined, and the larger point value is selected. Then, when the selected point value is greater than a predetermined threshold value (e.g., 10 points), the selected point value is adopted. In FIG. 15B, the acceptance probability point P1 is adopted and is greater than the threshold value. Thus, the exclusion request recommendation is set. In contrast, when the rejection probability point P2 is adopted and is greater than the threshold value, the correction recommendation is set.

As described above, the history analysis process uses the tendency that the number of suggestions of the static analysis is biased depending on hierarchies such as packages. The degree of relativity between the hierarchical character string to which the request for exclusion is made and the hierarchical character string to which the same kind of suggestion was output in the past is calculated to calculate the acceptance probability point P1 and the rejection probability point P2.

A description will be given of the request for exclusion and the determination of approval or disapproval thereof with reference to FIG. 16 through FIG. 21.

Figure 16:
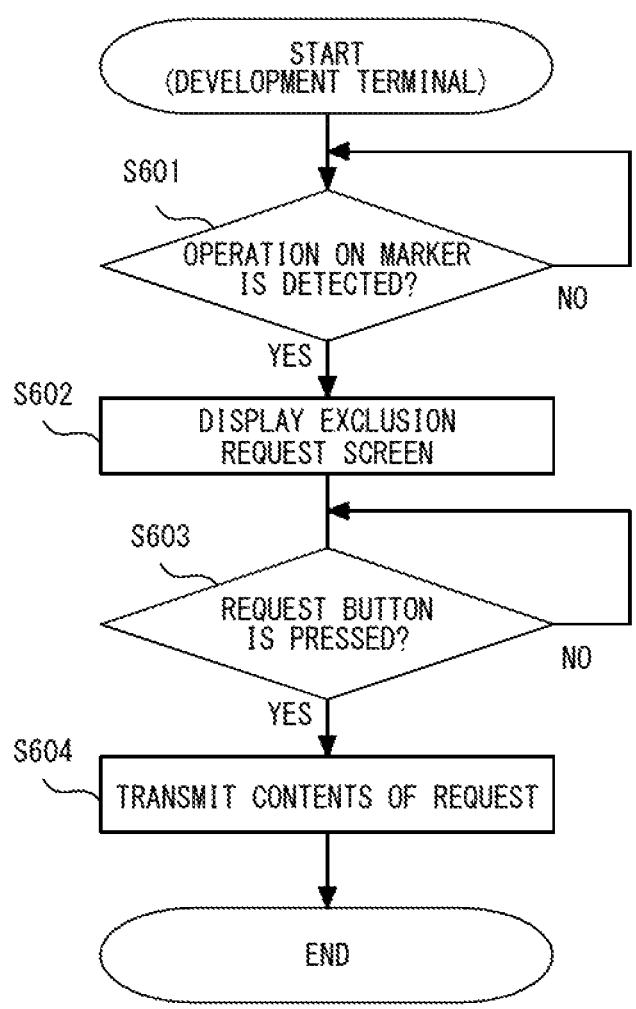
FIG. 16 is a flowchart of exemplary operations of the development terminal.
Figure 18:
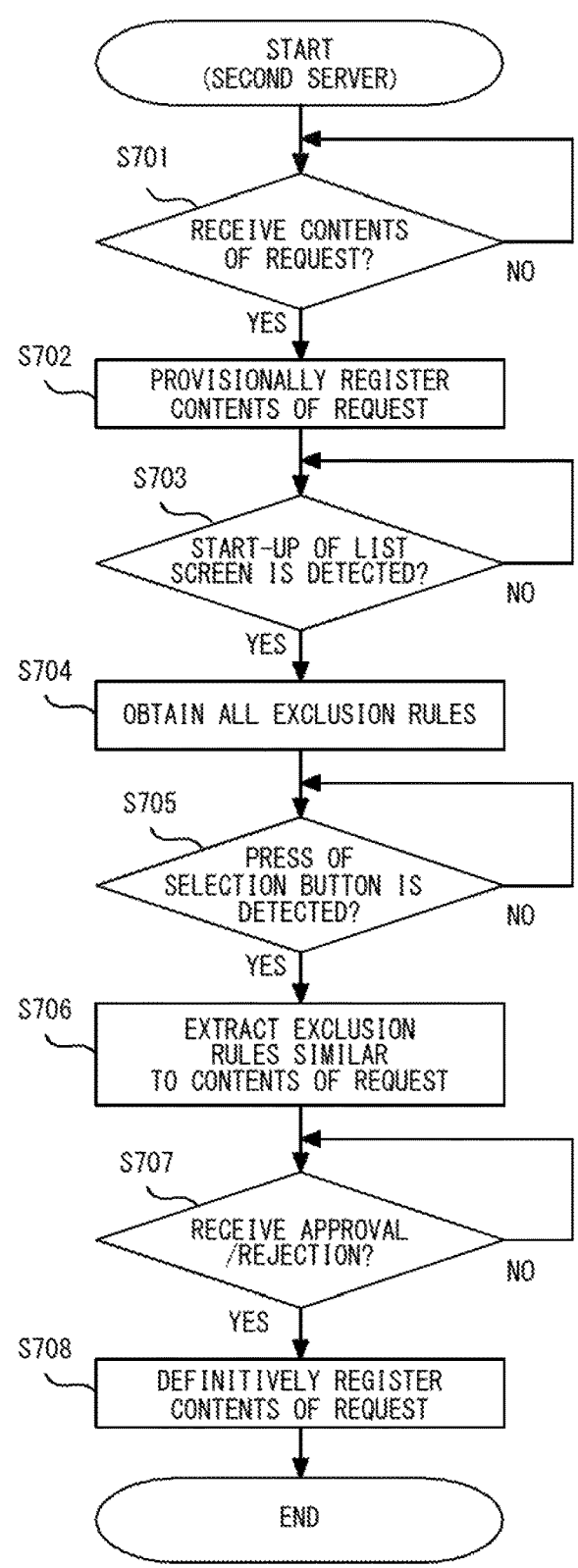
FIG. 18 is a flowchart of exemplary operations of the second server.
Figure 19:
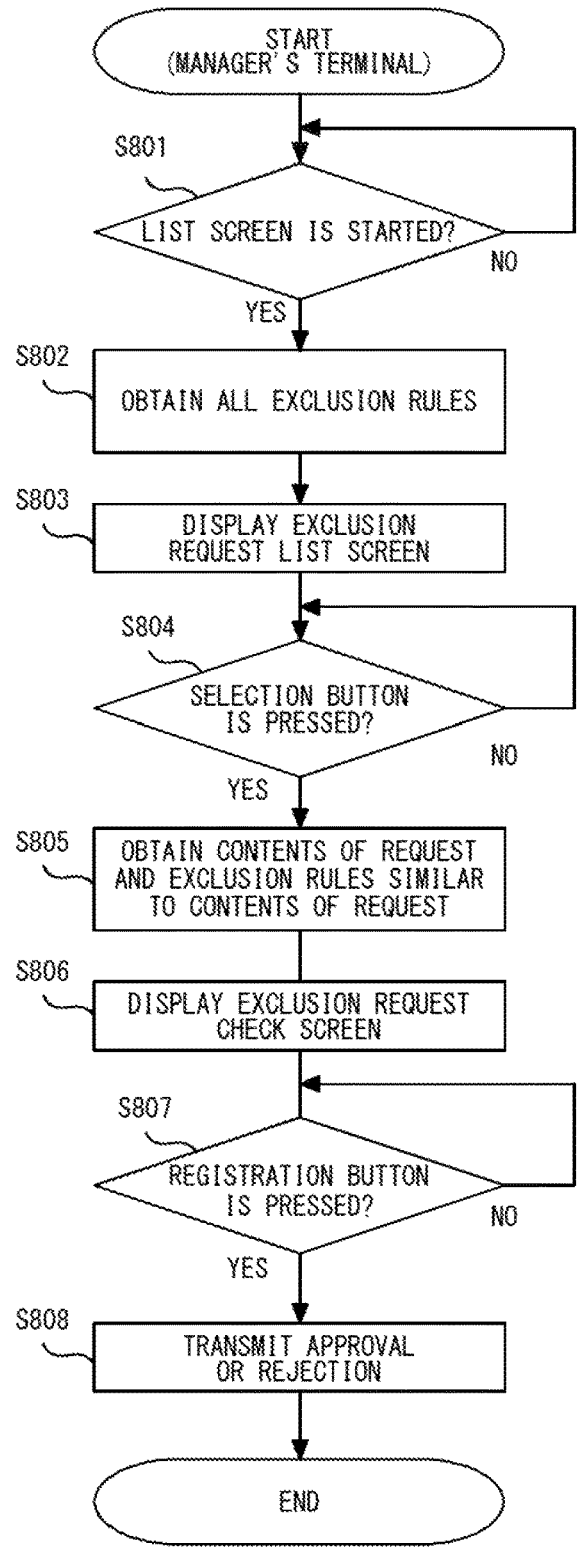
FIG. 19 is a flowchart of exemplary operations of a manager's terminal.

FIG. 16 is a flowchart of exemplary operations of the development terminal 100. FIG. 17 illustrates the exclusion request screen 20. FIG. 18 is a flowchart of exemplary operations of the second server 300. FIG. 19 is a flowchart of exemplary operations of the manager's terminal 400. FIG. 20 illustrates an exclusion request list screen 30. FIG. 21 illustrates an exclusion request check screen 40.

As illustrated in FIG. 16, the exclusion request unit 111C waits until the exclusion request unit 111C detects an operation to the marker M1 or M2 (step S601: NO). When detecting the operation to the marker M1 or M2 (step S601: YES), the exclusion request unit 111C displays the exclusion request screen 20 (step S602).

More specifically, referring to FIG. 17, when a specific operation (e.g., a right click) specifying the marker M1 or M2 displayed on the editor screen 10 (see FIG. 11) is made, the exclusion request unit 111C displays the exclusion request screen 20 as illustrated in FIG. 17. The exclusion request screen 20 includes: display fields Bx1 for displaying a tool name, a rule ID, a package, a class, a method, a message, a team name, and a name; an input field Bx2 for inputting a reason for request; a request button Bt1; and a cancel button Bt2. When detecting the specific operation specifying the marker M1 or M2, the exclusion request unit 111C displays the tool name through the name associated with the indicated marker M1 (or the marker M2) in the respective display fields Bx1. Thus, the developer who makes the request for exclusion by using the exclusion request screen 20 inputs the reason for the request for exclusion to the input field Bx2.

Referring back to FIG. 16, upon completion of the processing of step S602, the exclusion request unit 111C waits until the exclusion request unit 111C detects the press of the request button (step S603: NO). More specifically, as illustrated in FIG. 17, the exclusion request unit 111C waits until the exclusion request unit 111C detects the operation of pressing the request button Bt1 included in the exclusion request screen 20. When detecting the press of the request button (step S603: YES), the exclusion request unit 111C transmits the contents of the request (step S604). That is, the exclusion request unit 111C transmits the contents of the request including the items displayed in the display fields Bx1 and the item input to the input field Bx2, and other items (for example, the request date, the line number, the project name, and the like) to the second server 300.

On the other hand, as illustrated in FIG. 18, the exclusion request provisional registration unit 315 of the second server 300 waits until it receives the contents of the request (step S701: NO). When receiving the contents of the request (step S701: YES), the exclusion request provisional registration unit 315 provisionally registers the contents of the request in the exclusion rule table T2 (step S702). Upon completion of the processing of step S702, the exclusion rule history analysis unit 314 waits until it detects the start-up of a list screen (step S703: NO). The list screen is the exclusion request list screen described later. When detecting the start-up of the list screen (step S703: YES), the exclusion rule history analysis unit 314 obtains all the exclusion rules from the exclusion rule table T2 (step S704). When obtaining all the exclusion rules, the exclusion rule history analysis unit 314 holds the obtained all exclusion rules.

On the other hand, as illustrated in FIG. 19, a fourth information processing unit (not illustrated) of the manager's terminal 400 waits until the list screen is started (step S801: NO). When the list screen is started (step S801: YES), the fourth information processing unit obtains all the exclusion rules from the second server 300 (more particularly, the exclusion rule history analysis unit 314) (step S802). Upon completion of the processing of step S802, the fourth information processing unit displays the exclusion request list screen (step S803).

With reference to FIG. 20, the exclusion request list screen 30 will be described more specifically. Some constituent elements in the exclusion rule obtained by the fourth information processing unit are displayed on the exclusion request list screen 30. For example, the project name, the team name, the request date, the requester, the tool name, and the rule ID of the exclusion rule are displayed. The constituent elements to be displayed and the number of constituent elements to be displayed may be appropriately changed. Selection buttons Bt3 correspond to lines representing the some constituent elements of the exclusion rule. This structure allows a manager to understand records of requests for exclusion.

Referring back to FIG. 19, upon completion of the processing of step S803, the fourth information processing unit waits until the selection button Bt3 is pressed (step S804: NO). As illustrated in FIG. 18, upon completion of the processing of step S704, the exclusion rule history analysis unit 314 waits until it detects the press of the selection button Bt3 (step S705: NO).

When detecting the press of the selection button Bt3 (step S705: YES), the exclusion rule history analysis unit 314 extracts the exclusion rules similar to the contents of the request corresponding to the selection button Bt3 from the exclusion rules held by the exclusion rule history analysis unit 314 (step S706). Upon completion of the processing of step S706, the exclusion rule history analysis unit 314 holds the extracted exclusion rules.

On the other hand, as illustrated in FIG. 19, when the selection button Bt3 is pressed (step S804: YES), the fourth information processing unit obtains the contents of the request and the exclusion rules similar to the contents of the request from the second server (step S805). Upon completion of the processing of step S805, the fourth information processing unit displays the exclusion request check screen (step S806).

With reference to FIG. 21, the exclusion request check screen 40 will be described more specifically. Contents 41 of the request and exclusion rules 42 obtained by the fourth information processing unit are displayed on the exclusion request check screen 40. Selection buttons Bt4 for selecting the approval or rejection of the request for exclusion, an input field Bx3 for inputting a comment, a registration button Bt5, and a cancel button Bt6 are displayed on the exclusion request check screen 40. The manager checks the acceptance or rejection of the past requests for exclusion similar to the contents 41 of the request on the exclusion request check screen 40, and selects the approval or rejection as the response to the contents 41 of the request by using the selection button Bt4. The manager inputs the reason why the manager selected the approval or rejection as a comment in the input field Bx3, and presses the registration button Bt5.

As illustrated in FIG. 19, the fourth information processing unit waits until the registration button Bt5 is pressed (step S807: NO), and when the registration button Bt5 is pressed (step S807: YES), the fourth information processing unit transmits the approval or rejection (step S808). More particularly, the fourth information processing unit transmits the response selected by the selection button Bt4 to the second server 300.

On the other hand, as illustrated in FIG. 18, the exclusion request registration unit 316 waits until it receives the approval or the like from the manager's terminal 400 (step S707: NO). When receiving the approval or the like (step S707: YES), the exclusion request registration unit 316 definitively registers the contents of the request (step S708). That is, when the approval is selected for the target request for exclusion, the exclusion request registration unit 316 changes the status of the exclusion rule including the contents of the request for exclusion from "provisionally registered" to "accepted". On the other hand, when the rejection is selected for the target request for exclusion, the exclusion request registration unit 316 changes the status of the exclusion rule including the contents of the request for exclusion from "provisionally registered" to "rejected". This process stores the exclusion rule of which the status stores "accepted" or "rejected". The exclusion rule is used when the next reference information is output. Thus, the output accuracy of appropriate reference information is improved.

As described above, the manager does not need to ask the reason for request to the developer who made the request for exclusion over a telephone each time, and unproductive communication between the manager and the developer is reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention. For example, in the present embodiment, a specific character string (the exclusion request recommendation and the correction recommendation) is displayed as the reference information. However, the reference information may be represented by symbols such as "○" or "x".

What is claimed is:

1. A non-transitory computer readable storage medium storing a program causing a computer to execute a process, the process comprising:
    obtaining an analysis result of static analysis to a program hierarchically structured by a plurality of hierarchies;
    identifying a request for exclusion that were made to a message that is of a same kind as a specific message, which is related to useless suggestions, included in the analysis result by referring to a storage unit storing information about a request for exclusion that were made to a message displayed in the past when the specific message is displayed in association with a part, which corresponds to the specific message, of the program; and
    outputting reference information related to a request for exclusion that are made to the specific message depending on a request result of the request for exclusion that were made to the message that is of the same kind and a difference between a position in the plurality of hierarchies of the specific message in the program and a position in the plurality of hierarchies of the message that is of the same kind,
    the static analysis finds problems with quality in the program and feeds back the analysis result that includes messages representing suggestions according to the problems.

2. The non-transitory computer readable storage medium according to claim 1, wherein the reference information includes an indication of an exclusion request recommendation that recommends the request for exclusion of the specific message.

3. The non-transitory computer readable storage medium according to claim 1, wherein the process further comprises:
    identifying an attribute of a user when displaying the specific message; and
    displaying only another message of messages included in the analysis result, the another message corresponding to the attribute identified.

4. A non-transitory computer readable storage medium storing a program causing a computer to execute a process, the process comprising:
    identifying a request for exclusion that was made to a message that is of a same kind as a specific message, which is related to useless suggestions, included in an analysis result of static analysis to a program hierarchically structured by a plurality of hierarchies by referring to a storage unit storing information about a request for exclusion that were made to a message displayed in the past when receiving a request for exclusion of the specific message; and
    outputting reference information related to a determination of an approval or disapproval of the request for exclusion that are made to the specific message depending on a request result of the request for exclusion that were made to the message that is of the same kind and a difference between a position in the plurality of hierarchies of the specific message and a position in the plurality of hierarchies of the message that is of the same kind,
    the static analysis finds problems with quality in the program and feeds back the analysis result that includes messages representing suggestions according to the problems.

5. The non-transitory computer readable storage medium according to claim 4, wherein the reference information related to the determination of an approval or disapproval is a selection of an approval or a rejection.

6. A non-transitory computer readable storage medium storing a program causing a computer to execute a process, the process comprising:
    identifying a message that is of a same kind as a specific message, which is related to useless suggestions, included in an analysis result of static analysis to a program hierarchically structured by a plurality of hierarchies by referring to a storage unit storing information about a request for exclusion that were made to a message displayed in the past when receiving a request for exclusion that are made to the specific message; and
    outputting a diagram in which information indicating the specific message is mapped to a position corresponding to the information indicating the specific message and information indicating the message that is of the same kind is mapped to a position corresponding to the information indicating the message that is of the same kind in the plurality of hierarchies,
    the static analysis finds problems with quality in the program and feeds back the analysis result that includes messages representing suggestions according to the problems.

7. A method of outputting reference information implemented by a computer, the method comprising:
    obtaining an analysis result of static analysis to a program hierarchically structured by a plurality of hierarchies;
    identifying a request for exclusion that was made to a message that is of a same kind as a specific message, which is related to useless suggestions, included in the analysis result by referring to a storage unit storing information about a request for exclusion that were made to a message displayed in the past when the specific message is displayed in association with a part, which corresponds to the specific message, of the program; and
    outputting reference information related to a request for exclusion that are made to the specific message depending on a request result of the request for exclusion that were made to the message that is of the same kind and a difference between a position in the plurality of hierarchies of the specific message in the program and a position in the plurality of hierarchies of the message that is of the same kind,
    the static analysis finds problems with quality in the program and feeds back the analysis result that includes messages representing suggestions according to the problems.

8. A method of outputting reference information implemented by a computer, the method comprising:
    identifying a request for exclusion that was made to a message that is of a same kind as a specific message, which is related to useless suggestions, included in an analysis result of static analysis to a program hierarchically structured by a plurality of hierarchies by referring to a storage unit storing information about a request for exclusion that were made to a message displayed in the past when receiving a request for exclusion of the specific message; and
    outputting reference information related to a determination of an approval or disapproval of the request for exclusion that are made to the specific message depending on a request result of the request for exclusion that were made to the message that is of the same kind and a difference between a position in the plurality of hierarchies of the specific message and a position in the plurality of hierarchies of the message that is of the same kind, the static analysis finds problems with quality in the program and feeds back the analysis result that includes messages representing suggestions according to the problems.

9. A reference information output device comprising:
a memory storing information about a request for exclusion of a message displayed in the past; and
a processor coupled to the memory and configured to:
obtain an analysis result of static analysis to a program hierarchically structured by a plurality of hierarchies;
identify a request for exclusion that was made to a message that is of a same kind as a specific message, which is related to useless suggestions, included in the analysis result by referring to the memory when the specific message is displayed in association with a part, which corresponds to the specific message, of the program; and
output reference information related to a request for exclusion that are made to the specific message depending on a request result of the request for exclusion that were made to the message that is of the same kind and a difference between a position in the plurality of hierarchies of the specific message in the program and a position in the plurality of hierarchies of the message that is of the same kind,
the static analysis finds problems with quality in the program and feeds back the analysis result that includes messages representing suggestions according to the problems.

10. The reference information output device according to claim 9, wherein the reference information includes an indication of an exclusion request recommendation that recommends the request for exclusion of the specific message.

11. The reference information output device according to claim 9, wherein the processor is configured to:
identify an attribute of a user when displaying the specific message; and
display only another message of messages included in the analysis result, the another message corresponding to the attribute identified.

12. A reference information output device comprising:
a memory storing information about a request for exclusion of a message displayed in the past; and
a processor coupled to the memory and configured to:
identify a request for exclusion that was made to a message that is of a same kind as a specific message, which is related to useless suggestions, included in an analysis result of static analysis to a program hierarchically structured by a plurality of hierarchies by referring to the memory when receiving a request for exclusion that were made to the specific message; and
output reference information related to a determination of an approval or disapproval of the request for exclusion that are made to the specific message depending on a request result of the request for exclusion that were made to the message that is of the same kind and a difference between a position in the plurality of hierarchies of the specific message and a position in the plurality of hierarchies of the message that is of the same kind,
the static analysis finds problems with quality in the program and feeds back the analysis result that includes messages representing suggestions according to the problems.

13. The reference information output device according to claim 12, wherein the reference information related to the determination of an approval or disapproval is a selection of an approval or a rejection.

14. A non-transitory computer readable storage medium according to claim 1, wherein the problems are defects or violations of coding rules in the program.

15. A non-transitory computer readable storage medium according to claim 1, wherein the useless suggestions are a suggestion that is unimportant to developers who creates the program and a suggestion that does not need to be corrected for the convenience of the project, and the request for exclusion is a request that excludes the useless suggestion from next analysis result of the static analysis.

* * * * *